United States Patent
Dambrine et al.

(10) Patent No.: US 9,476,309 B2
(45) Date of Patent: Oct. 25, 2016

(54) METHOD OF FABRICATING A PART AND A COMPOSITE SOLID PART OBTAINED BY THE METHOD

(75) Inventors: Bruno Dambrine, Le Chalet en Brie (FR); Thierry Godon, Sevran (FR)

(73) Assignee: SNECMA, Paris (FR)

( * ) Notice: Subject to any disclaimer, the term of this patent is extended or adjusted under 35 U.S.C. 154(b) by 786 days.

(21) Appl. No.: 13/824,728

(22) PCT Filed: Sep. 26, 2011

(86) PCT No.: PCT/FR2011/052239
§ 371 (c)(1),
(2), (4) Date: Jun. 17, 2013

(87) PCT Pub. No.: WO2012/042160
PCT Pub. Date: Apr. 5, 2012

(65) Prior Publication Data
US 2013/0259701 A1    Oct. 3, 2013

(30) Foreign Application Priority Data

Sep. 28, 2010 (FR) .................................. 10 57799

(51) Int. Cl.
*F01D 5/28* (2006.01)
*B22F 3/15* (2006.01)
*C22C 47/06* (2006.01)

(52) U.S. Cl.
CPC .............. *F01D 5/282* (2013.01); *B22F 3/15* (2013.01); *C22C 47/062* (2013.01)

(58) Field of Classification Search
CPC . G06F 3/0484; G06F 17/3064; D03D 25/00; D03D 15/02; D03D 23/00; F01D 5/282; F01D 5/14; F01D 5/28; F01D 5/286; F05D 2300/6012; F05D 2300/6034; F05B 2280/6002; F05B 2280/6003

USPC ......... 416/230, 241 R, 229 R, 229 A, 241 A; 156/189, 148; 139/383 R, 425 R; 29/889.71, 889.7; 442/6, 209, 229; 428/156
See application file for complete search history.

(56) References Cited

U.S. PATENT DOCUMENTS 826,063 A     7/1906  Reid
4,762,268 A *  8/1988  Doble ................... B23K 20/04
                                                228/186

(Continued)

FOREIGN PATENT DOCUMENTS

CN        1043664 A      7/1990
CN      101531536 A      9/2009

(Continued)

OTHER PUBLICATIONS

International Search Report Issued Mar. 19, 2012 in PCT/FR11/052239 Filed Sep. 26, 2011.
Office Action issued Nov. 17, 2015 in Russian Patent Application No. 2013119666.
Office Action issued Jan. 5, 2016 in Japanese Patent Application No. 2013-530783 (with English language translation).

(Continued)

*Primary Examiner* — Dwayne J White
*Assistant Examiner* — Aaron R Eastman
(74) *Attorney, Agent, or Firm* — Oblon, McClelland, Maier & Neustadt, L.L.P.

(57) ABSTRACT

A method of fabricating a part, for example a reinforcing edge for a turbomachine blade, the method including: making at least one fiber structure by three-dimensionally weaving metal yarns; and subjecting the fiber structure to hot isostatic pressing to cause the metal yarns to agglomerate so as to obtain a solid part. A composite solid part, for example a reinforcing edge for a turbomachine blade, includes a reinforcing structure of three-dimensionally woven ceramic fibers and a metal or metal alloy matrix.

10 Claims, 5 Drawing Sheets

(56) References Cited

U.S. PATENT DOCUMENTS

| | | | | |
|---|---|---|---|---|
| 5,104,726 | A | * | 4/1992 | Ross .................. D03D 1/0052 139/384 R |
| 5,277,973 | A | * | 1/1994 | Yamamura ........ C04B 35/62272 423/447.1 |
| 5,899,241 | A | * | 5/1999 | David .................... D03D 5/005 139/408 |
| 8,685,868 | B2 | * | 4/2014 | Bouillon ................ B29C 70/24 139/384 R |
| 2005/0053466 | A1 | | 3/2005 | Finn et al. |
| 2005/0084377 | A1 | * | 4/2005 | Dambrine ............... B29C 70/48 416/223 R |
| 2006/0257260 | A1 | | 11/2006 | Dambrine et al. |
| 2007/0051455 | A1 | | 3/2007 | Franchet et al. |
| 2008/0009210 | A1 | * | 1/2008 | Goering ................ B29C 70/222 442/181 |
| 2009/0163100 | A1 | * | 6/2009 | Goering ................. B29B 11/16 442/205 |
| 2011/0182743 | A1 | * | 7/2011 | Naik ....................... B29B 11/16 416/230 |
| 2011/0293828 | A1 | * | 12/2011 | Eberling-Fux .......... C04B 35/52 427/249.2 |
| 2013/0105031 | A1 | * | 5/2013 | Dambrine ................ B22F 3/15 139/383 R |

FOREIGN PATENT DOCUMENTS

| | | |
|---|---|---|
| CN | 103153505 A | 6/2013 |
| EP | 1 526 285 | 4/2005 |
| EP | 1 726 677 | 11/2006 |
| FR | 2 939 130 A1 | 6/2010 |
| JP | 62-120445 A | 6/1987 |
| JP | 1-93104 A | 4/1989 |
| JP | 2005-113908 A | 4/2005 |
| JP | 2005-133717 A | 5/2005 |
| WO | WO 2006136755 A2 * | 12/2006 |
| WO | WO 2009/034264 A2 | 3/2009 |
| WO | 2010 061139 | 6/2010 |
| WO | WO 2010/061140 A1 | 6/2010 |
| WO | WO 2010061139 A2 * | 6/2010 |

OTHER PUBLICATIONS

Office Action issued Aug. 11, 2015 in Japanese Patent Application No. 2013-530783 (with English language translation).

Combined Chinese Office Action and Search Report issued Sep. 3, 2014 in Patent Application No. 201180046446.2 (with English language translation and English translation of categories of cited documents).

* cited by examiner

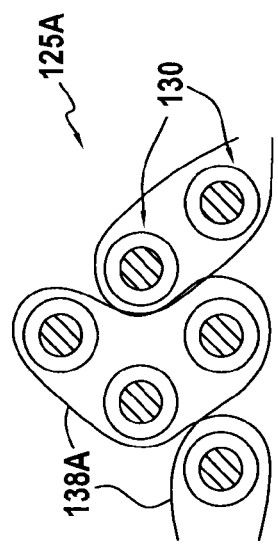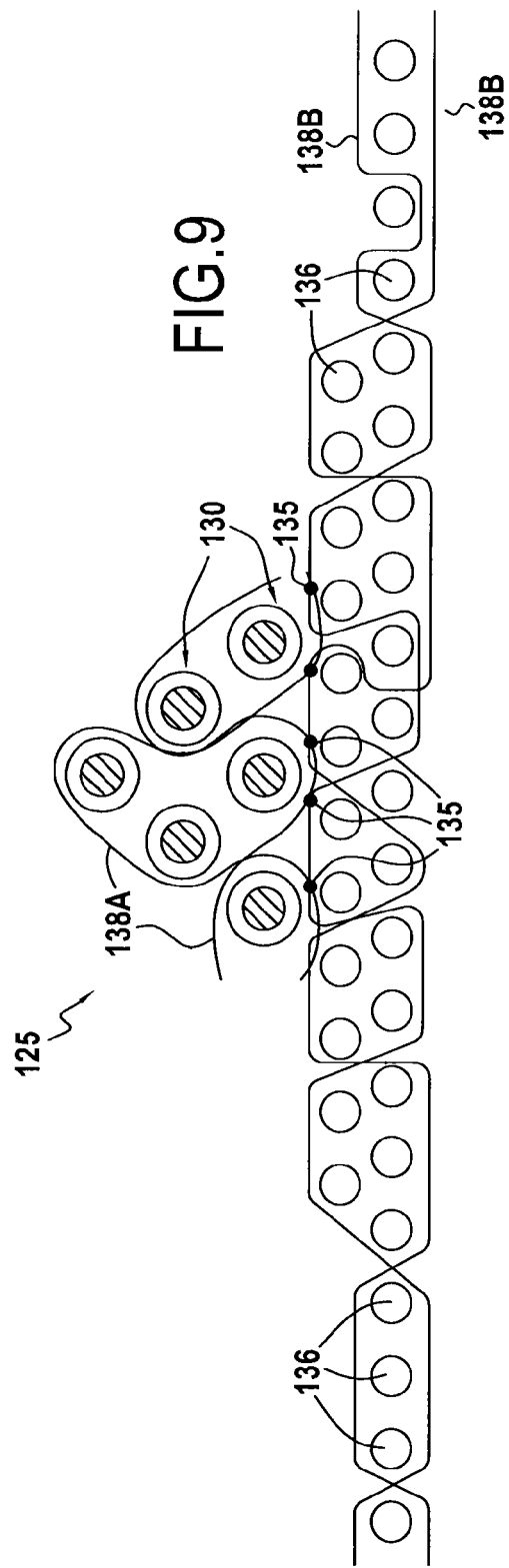

METHOD OF FABRICATING A PART AND A COMPOSITE SOLID PART OBTAINED BY THE METHOD

FIELD OF THE INVENTION

The present description relates to a method of fabricating a part and to a composite solid part obtained by the method.

More particularly, the part may be a reinforcing edge for a fan blade of a turbomachine. Such a reinforcing edge may be fitted to any type of turbomachine, whether for use on land or in an aircraft, and in particular to a helicopter turboshaft engine or to an airplane turbojet.

STATE OF THE ART

Turbomachine fan blades are subjected to high levels of mechanical stress, associated in particular with their speed of rotation, while also needing to satisfy strict conditions concerning their weight and size. One of the options that have been envisaged for reducing the weight of blades is to fabricate them out of composite material. Nevertheless, turbomachine fan blades must also satisfy severe criteria in use, and in particular they must be capable of withstanding impacts from foreign bodies and abrasion. For example, a front fan blade of an airplane turbojet must withstand impacts from birds that are struck in flight and also abrasion in flight. Unfortunately, when the leading edge of a blade is made out of the same composite material as the body of the blade, the leading edge runs the risk of having insufficient ability to withstand impacts and abrasion.

In order to mitigate that problem, it has been envisaged that the blade can be consolidated at its leading edge by using a part that is fitted onto the body of the blade, and that fits into the aerodynamic profile of the blade. Such a fitted part is referred to as a reinforcing edge.

A reinforcing edge is generally a solid part that extends longitudinally in a substantially radial direction relative to the axis of rotation of the fan, and in cross-section it has a profile that is generally C-shaped, with a central portion of large thickness between tapering branches. The reinforcing edge thus has a longitudinal central portion of considerable thickness referred to as a "nose", between thin longitudinal flanks.

The thickness of such a reinforcing edge thus varies, typically being several millimeters in its central portion and decreasing to a few tenths of a millimeter only (e.g. 0.2 mm) at the ends of its tapering branches.

A reinforcing edge must also have a shape that is twisted and cambered, i.e. a shape that is complementary to the shape of the upstream edge of the blade body on which it is fitted.

Finally, on its outside face, a reinforcing edge must have a smooth surface state so as to avoid harming the aerodynamic properties of the blade, and on its inside face it must have a radius of curvature of good quality so as to be a close fit to the upstream edge of the blade body on which it is fitted.

It is known to fabricate reinforcing edges by hot-shaping and machining a part made of titanium alloy. Nevertheless, because of the above-mentioned requirements, the shaping and machining operations are numerous, lengthy, and complex, thereby having the consequence of increasing the cost of fabricating the reinforcing edge. Unfortunately, the cost of fabricating a reinforcing edge using known fabricating methods is found nowadays to be too high, in particular because it represents too great a fraction of the total cost of fabricating the fan blade.

There therefore exists a real need for a method of fabrication that makes it possible to fabricate a fan blade reinforcing edge more easily and at lower cost while complying as well as possible with the above-mentioned requirements.

SUMMARY OF THE INVENTION

The present disclosure provides a method of fabricating a part, the method comprising the following steps:
  making at least one fiber structure by three-dimensionally weaving metal yarns; and
  subjecting the fiber structure to hot isostatic pressing so as to cause the metal yarns to agglomerate in such a manner as to obtain a solid part.

In the present description, said solid part is also referred to as a "final part".

Making the fiber structure(s) by three-dimensional weaving makes it possible to obtain good mechanical strength for the structure(s), and thus for the final part, in a single operation.

Furthermore, the metal yarns interlaced by three-dimensional weaving are capable of moving relative to each other so it is possible to deform the fiber structure, thereby enabling the support and thus the final part to be given a shape that is complex, in particular a shape that is twisted and/or cambered.

Three-dimensional weaving also makes it possible to obtain a fiber structure, and thus a final part, that is of varying thickness, which thickness may become very small since it is possible to perform continuous three-dimensional weaving between portions that are thick and portions that are very thin.

Such a method is thus very well suited to fabricating a reinforcing edge for a turbomachine fan blade.

The hot isostatic pressing (HIP) step acts by compaction to provide the final shape to the fiber structure and to densify it by diffusion welding its metal yarns together. The resulting solid part has porosity that is zero or very small.

The hot isostatic pressing may be performed in an isothermal press or in a bag in an autoclave, and the tooling used can be reused for several fabrication cycles. Furthermore, it is possible to compact a plurality of parts at the same time. The cost of fabricating parts is thus decreased.

In certain embodiments, the fabricated part extends in a first direction and has thickness that varies in a plane perpendicular to the first direction; the warp yarns used for the three-dimensional weaving extend along the first direction; and the variation in the thickness of the part is obtained by using warp yarns of different diameters and optionally a varying contexture.

The greatest-thickness portions of the part are generally fabricated using the largest-diameter warp yarns.

When the fabricated part is a reinforcing edge for a turbomachine fan blade, said first direction is the longitudinal direction of the reinforcing edge.

In certain embodiments, the metal yarns used are:
  yarns made of metal or metal alloy, in particular of titanium (Ti) or titanium all and/or
  composite yarns comprising a central ceramic fiber, in particular made of silicon carbide (SiC), and a metal or metal alloy coating in particular made of titanium or of titanium alloy or of boron alloy.

The composite yarns are advantageously used in the portions of the part that are the most highly stressed mechanically. For example, in a reinforcing edge, the composite yarns are situated on the side that is subjected to impacts, i.e. in the outside zone of the reinforcing edge (the zone that is situated furthest from the body of the blade).

In certain embodiments, a plurality of fiber structures—or "sub-structures"—are made by three-dimensional weaving, these fiber structures are assembled together, and the resulting assembly—or "final structure"—formed by the assembled fiber structures is subjected to said hot isostatic pressing.

The final structure generally has a multilayer configuration obtained by stacking a plurality of sub-structures of different shapes and geometrical configurations.

This solution makes it possible to mitigate difficulties of weaving, of handling, and of cold-shaping that might possibly be encountered with a fiber structure made as a single piece. Such difficulties can appear in particular when the part that is to be fabricated has large variations in thickness, with these variations in thickness either generating difficulties during weaving (in particular because of excessive tensions in the smallest-diameter yarns), or being impossible to obtain solely by varying the diameters of the warp yarns and the contexture, or else resulting from the metal yarns and/or the sub-structure itself having resilient return.

The step of assembling the fiber structures (or sub-structures) together may be performed in various ways.

In certain embodiments, the fiber structures are assembled together by implanting connecting yarns, each connecting yarn passing through each of the preforms, at least in part. For example, the fiber structures may be assembled together by stitching metal yarns.

In certain embodiments, the fiber structures are assembled together by draping, by welding, and/or by adhesive.

Furthermore, in certain embodiments, at least one metal insert is arranged between two fiber structures (i.e. two sub-structures) before assembling them together. Such an insert makes it possible to obtain portions of greater thickness in the final structure. The insert(s) may be connected to the sub-structures in various ways, for example by welding, by adhesive, by being held captive between two fiber structures, and/or by being inserted directly into the tooling.

Several embodiments of the proposed method are described in the present description. Nevertheless, unless specified to the contrary, the characteristics that are described with reference to any one particular embodiment may be applied to any other embodiments.

The present disclosure also provides a composite solid part comprising a reinforcing structure of three-dimensionally woven ceramic fibers and a metal or metal alloy matrix.

Because of the presence of the three-dimensionally woven ceramic fiber reinforcing structure, such a part has increased mechanical strength.

It should be observed that the reinforcing structure does not necessarily extend throughout the part, but on the contrary it may be located solely in those zones of the part that are the most highly stressed mechanically.

In certain embodiments, said solid part is a reinforcing edge for a turbomachine fan blade.

Such a reinforcing edge may be fastened, e.g. by adhesive, on the body of a blade in order to protect it. It is generally designed to be fitted to the leading edge of the blade, but it could also be fitted to the trailing edge.

In certain embodiments, said reinforcing edge extends longitudinally in a first direction, and in cross-section (i.e. in a plane perpendicular to the first direction), it has a profile that is generally C-shaped, with a central portion of large thickness between tapering branches, and said reinforcing structure is situated at least in the outside zone of the central portion, i.e. in the zone of the central portion that is situated on the convex side of the profile.

Since the central portion, in particular the outside of the reinforcing edge, is the portion that is the most exposed to impacts, the presence of the reinforcing structure in this portion is used to reinforce it.

In certain embodiments, the warp yarns of larger diameter in the reinforcing structure are situated at least in said central portion, and at least on the outside of the reinforcing edge.

Since the larger-diameter warp yarns have the best mechanical properties, their presence in a portion of the part is used to obtain better mechanical reinforcement of that portion.

The present disclosure also provides a turbomachine fan blade including a reinforcing edge as described above, and a turbomachine including such a fan blade.

Several embodiments of the composite solid part are described in the present description. Nevertheless, unless specified to the contrary, characteristics described with reference to any one embodiment may be applied to any other embodiment.

BRIEF DESCRIPTION OF THE DRAWINGS

The accompanying drawings are diagrammatic and not necessarily to scale, since they seek above all to illustrate the principles of the invention.

In the drawings, from one figure to another, elements (or element portions) that are identical are identified by the same reference signs. In addition, elements (or element portions) that belong to different embodiments but that are analogous in function are referenced by the same numerical references plus 100, 200, etc.

FIG. 8 shows two examples of fiber structures or sub-structures for assembling together, in their state before hot isostatic pressing.

FIG. 9 shows the two FIG. 8 sub-structures once assembled together.

DETAILED DESCRIPTION OF EMBODIMENT(S)

The embodiments of the invention described in detail below with reference to the accompanying drawings seek to show the characteristics and advantages of the invention. Nevertheless, it should be recalled that the invention is not limited to these examples.

Figure 1:
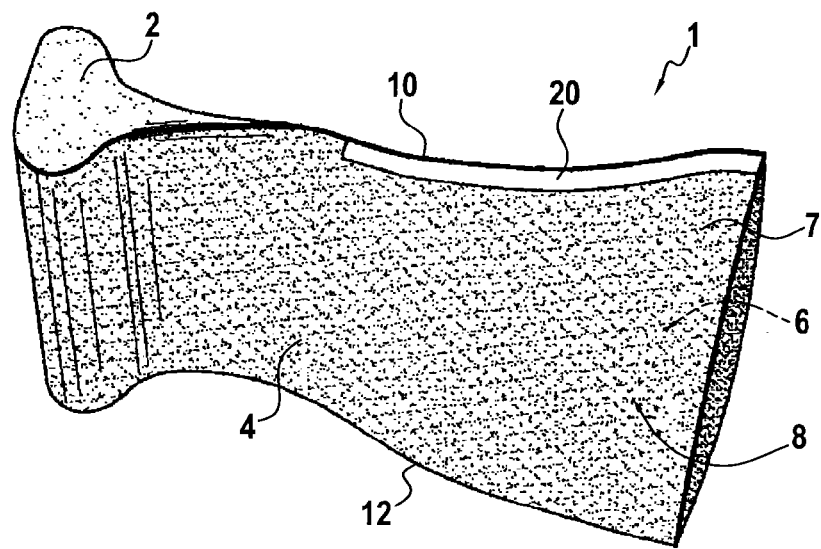
FIG. 1 is a perspective view of an example of a turbomachine fan blade fitted with an example reinforcing edge.

FIG. 1 shows a turbomachine blade 1 of the fan blade type having a large chord. Such a blade 1 is of complex shape and comprises a root 2 that is extended by an airfoil 4 in a direction that is radial relative to the axis of rotation of the fan. The airfoil 4 is for placing in the path of the fluid flow passing through the engine, and it is provided with two outside surfaces, respectively referred to as a suction side surface 6 and a pressure side surface 8. At their "upstream" ends, these surfaces 6 and 8 are connected together by a leading edge 10, and at their "downstream" ends they are connected together by a trailing edge 12 (where upstream and downstream are defined relative to the normal flow direction of gas through the turbomachine). Typically, the length of the leading edge 10 and of the trailing edge 12 is of the order of 500 mm. Reinforcing edges may be fastened on the body 7 of the blade at its trailing edge 12 and above all at its leading edge 10 in order to avoid, or at least to retard, damage thereto, in particular in the event of impact.

In the example shown, a reinforcing edge 20 is fastened to the body 7 of the blade on its leading edge 10. The leading edge 10 is constituted at least in part by the reinforcing edge 20 that fits as closely as possible to the general shape of the blade so as to avoid spoiling the mechanical and aerodynamic properties thereof.

Figure 2:
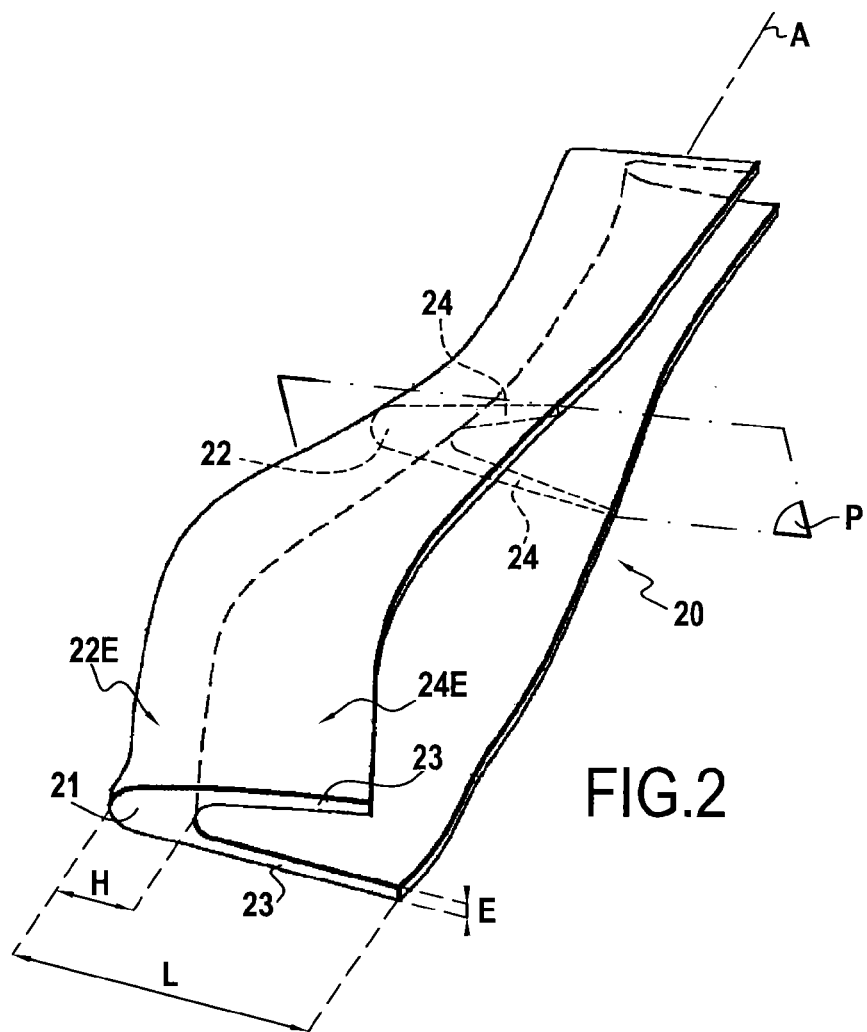
FIG. 2 is a perspective view of the FIG. 1 reinforcing edge.

The fan blade 1 is of complex shape, as shown in FIG. 1. In particular, the blade is twisted in its longitudinal direction and cambered in its transverse direction. The reinforcing edge 20 thus also presents a shape that is complex, as shown in FIG. 2.

More precisely, the reinforcing edge 20 extends longitudinally in a first direction A and, in section in a plane P perpendicular to the first direction (i.e. in cross-section), it presents a profile that is generally C-shaped, with a central region 22 of large thickness between tapering branches 24. The reinforcing edge 20 thus presents a longitudinal central portion 21 of large thickness having two longitudinal flanks 23 bordering each of its sides, the flanks being of thinner section towards their distal ends. The outside faces 24E of the flanks 23 run on continuously with the pressure and suction side faces 8 and 6 of the blade. The outside face 22E of the central portion 21 forms the leading edge 10 of the blade, once the reinforcing edge 20 has been fastened on the body 7 of the blade (see FIG. 1).

An example of dimensions for such a reinforcing edge 20 is an overlap length L of about 20 mm to 500 mm, e.g. 250 mm, a maximum thickness H for the central portion 21 (or the central region 22) of about 1 mm to 25 mm, e.g. 7 mm, and a minimum thickness E for the flanks 23 (or the branches 24) lying in the range 0.1 mm to 6 mm, e.g. 1 mm, with the thickness of the flanks 23 decreasing on approaching the ends of the flanks 23 (the thicknesses being measured in the plane P, perpendicularly to the tangents to the profiles of the outside faces 22E, 24E). It should be observed that the thickness of such a part varies considerably.

In order to fabricate a part such as the reinforcing edge 20, an initial operation is to make at least one fiber structure by three-dimensional weaving.

It should be recalled that weaving consists in interlacing warp yarns and weft yarns. In weaving terminology, a "weave" is the manner in which the warp yarns and the weft yarns are interlaced.

In the present description, the term "three-dimensional" weaving (or "3D weaving") is used to designate a weaving technique in which at least some of the warp yarns link together weft yarns over a plurality of weft layers.

Three-dimensional weaving thus differs from more conventional "two-dimensional" weaving (or "2D weaving") in that each warp yarn passes from one side to the other of the yarns in a single weft layer.

There are various kinds of three-dimensional weaving that differ by the manner in which the warp yarns and the weft yarns are interlaced. For example a three-dimensional weave may be of the "interlock" type or of the "multilayer" type.

Figure 3:
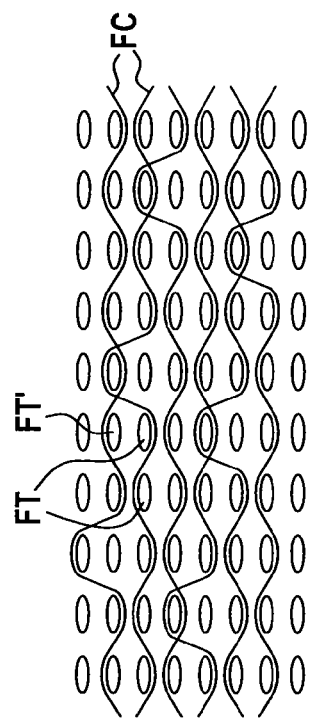
FIG. 3 is a plan for an interlock type three-dimensional weave.

The term "interlock weaving" is used to designate 3D weaving with a weave in which each warp layer links together a plurality of weft layers, with all of the yarns in the same warp column having the same movement in the weave plane. FIG. 3 is a plan of an interlock weave with seven warp yarn layers FC and eight weft yarn layers FT. In the interlock weave shown, a weft layer T is made up of two adjacent weft half-layers t that are offset from each other in the warp direction. There are thus sixteen weft half-layers in a staggered configuration. Each warp yarn FC links together three weft half-layers. Below, the term "layer" may be used to designate a complete layer or a half-layer of weft yarns, unless specified to the contrary.

It is also possible for the weft yarns FT to adopt an arrangement that is not staggered, with the weft yarns FT of two adjacent weft layers being aligned on the same columns.

Figure 4:
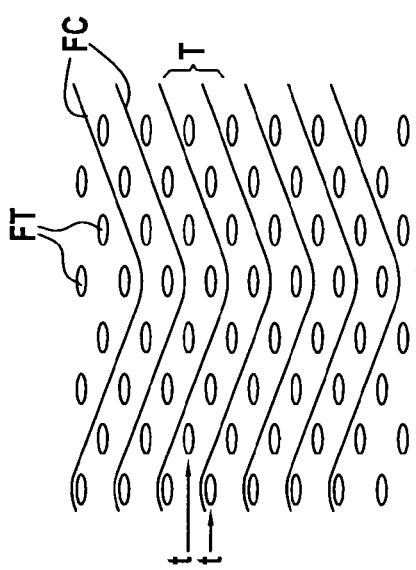
FIG. 4 is a plan for a multilayer type three-dimensional weave.

The term "multilayer weaving" is used to mean 3D weaving with a plurality of layers of weft yarns in which the base weave of each layer is equivalent to a conventional 2D weave (e.g. a weave of plain, satin, or twill type) but with certain points of the weave that link the weft layers together. FIG. 4 shows a plan of a multilayer weave of the plain type or "multi-plain" type in which the warp yarns FC are deflected from time to time from their conventional plain 2D path associated with one weft layer in order to capture a yarn FT' of an adjacent weft layer and form particular plain points PT that link together two adjacent weft layers. At a particular plain point PT the warp yarn FC passes around two weft yarns FT and FT' situated in the same column in two adjacent weft layers.

It should be observed that linking by a given weft yarn FC in a multilayer weave is not limited to two adjacent weft layers, but may extend over a depth of more than two weft layers.

Finally, the term "contexture" is used to designate the number of yarns per unit length in the weft direction and in the warp direction, a low contexture (or slack structure) designating a smaller number of yarns and thus a weave that is more open, as contrasted to a high contexture (or tight structure).

In the present description and in all of the drawings, it is stated and shown by convention and for reasons of convenience that it is the warp yarns that are deflected from their paths in order to take hold of weft yarns in a weft layer or in a plurality of weft layers. Nevertheless, it is possible to interchange roles between warp and weft, and such an interchange should be considered as being covered by the claims.

In order to fabricate a part such as the reinforcing edge 20, the initial step is thus to make at least one fiber structure by three-dimensionally weaving metal yarns.

Figure 5:
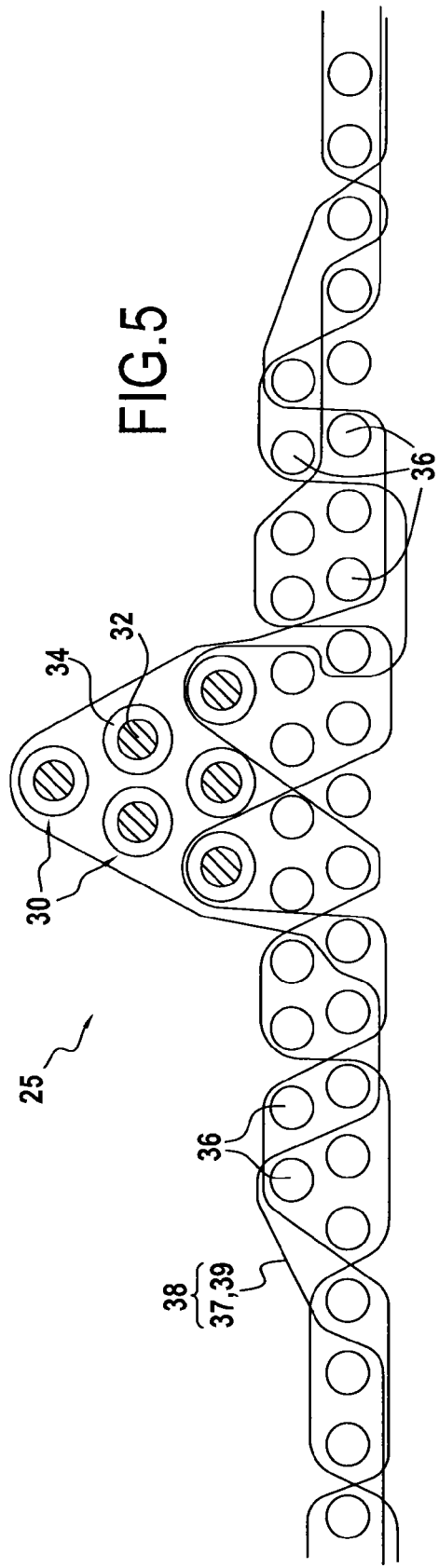
FIG. 5 is a diagram showing an example of a fiber structure made by three-dimensional weaving.

FIG. 5 shows an example of such a fiber structure 25 made by three-dimensional weaving of the following metal yarns:

large-diameter (e.g. 0.5 mm) composite yarns 30 comprising a central ceramic fiber 32 made of silicon carbide (SiC) covered by a coating 34 of titanium (or boron) alloy, yarns of this type being referred to by the person skilled in the art as "SiC/Ti yarns" or "SiC—Ti yarns" or "SiC/B yarns" or "SiC—B yarns" for a coating of boron alloy);

smaller-diameter (e.g. 0.1 mm) yarns 36 of titanium alloy (e.g. an alloy of the TA6V, Ti6242, etc. type); and small-diameter (e.g. 0.25 mm) composite yarns 38 comprising a central ceramic fiber 39 of silicon carbide (SiC) covered by a coating 37 of titanium (or boron) alloy.

In FIG. 5, the composite yarns 38, the ceramic fibers 39, and their coating 37 are all represented by lines of the same kind.

The metal yarns 30, 36, and 38 are interlaced by three-dimensional weaving so as to form a single fiber structure or single-piece structure. The metal yarns 30 and 36 are used as warp yarns and they are oriented substantially in the first direction A (see FIG. 2), while the metal yarns 38 are used as weft yarns.

It should be observed that the large-diameter metal yarns are used in the thickest portion of the fiber structure, with the large diameter of these yarns being used, in particular, to obtain a structure of large thickness.

It should also be observed that the interlaced ceramic fibers 32 and 39 form a ceramic fiber reinforcing structure that is woven in three dimensions, in the meaning of the present description, and that like the composite yarns 30, the larger-diameter ceramic fibers are the ceramic fibers 32.

Finally, it should be observed that the metal yarns used could all be made of composite material or they could all be made of metal or of alloy (e.g. an alloy of the TA6V, Ti6242, etc. type). Similarly, the metal yarns used could all have the same diameter.

Figure 6:
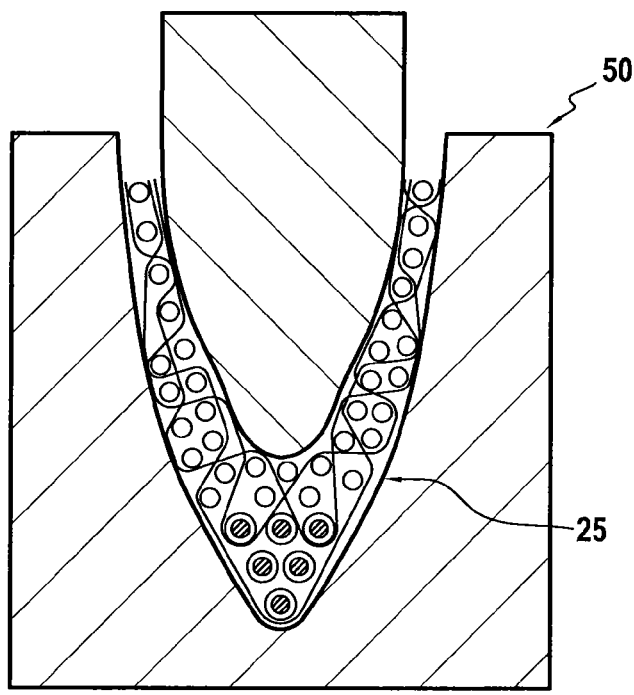
FIG. 6 shows the FIG. 5 fiber structure positioned in a hot isostatic press tool.

The fiber structure of FIG. 5 is then arranged inside tooling 50 shown diagrammatically in FIG. 6, and is then subjected to hot isostatic pressing. In the example shown, the fiber structure is maintained at 940° C. for 120 minutes (min) under a pressure of 1000 bars.

Figure 7:
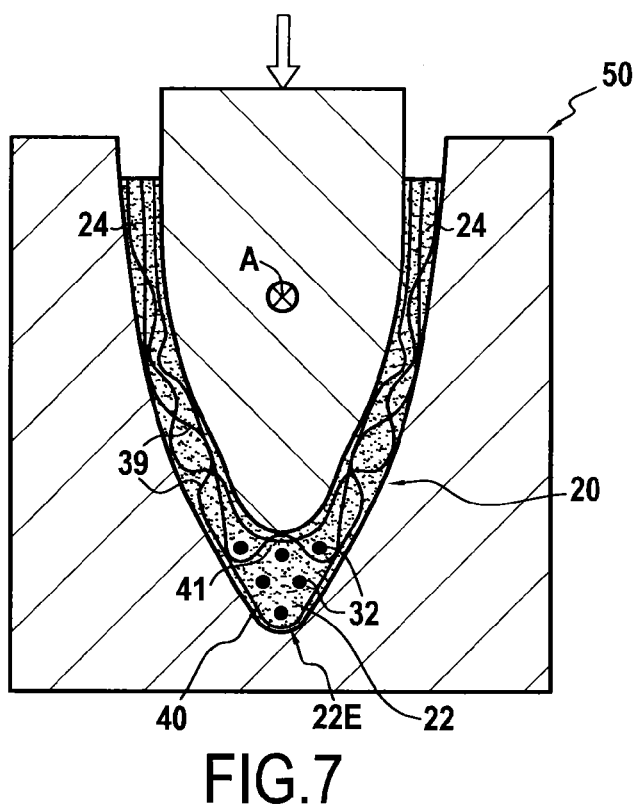
FIG. 7 shows the solid part obtained after hot isostatic pressing.

At the end of hot isostatic pressing, the reinforcing edge 20 of FIG. 2 is obtained, this reinforcing edge 20 being shown in diagrammatic cross-section in FIG. 7.

This reinforcing edge 20 is an example of a composite solid part in the meaning of the present description. It comprises a reinforcing structure 40 of three-dimensionally woven ceramic fibers 32, 39 together with a matrix 41 of metal alloy. This matrix 41 results from the titanium alloy coating 34 of the yarns 30, the titanium alloy coating 37 of the yarns 38, and the titanium alloy of the yarns 36 being agglomerated by being compacted and by diffusion-welding.

It should be noted that the reinforcing edge 20 extends in a first direction A (see FIGS. 2 and 7), that it presents thickness that varies in a plane perpendicular to this first direction A, and that the ceramic fibers 32 forming warp yarns in the woven reinforcing structure 40 likewise extends in the first direction A. In addition, in the layer of the reinforcing edge 20 that is of greatest thickness, the reinforcing structure 40 has the largest-diameter warp yarns.

As mentioned above, the portion of the reinforcing edge 20 that is the most exposed to impacts is the central portion 22, and more precisely the zone of the central portion 22 that is situated on the outside of the reinforcing edge (i.e. beside the outside face 22E). This zone is referred to below as the "sensitive zone".

It should be observed that the reinforcing structure 40 of ceramic fibers 32, 39 woven in three dimensions is situated specifically in said sensitive zone so as to reinforce it. It should be observed that the largest-diameter warp yarns (i.e. the ceramic fibers 32) of the reinforcing structure 40, i.e. the yarns of the structure that present the greatest mechanical strength, are likewise situated in this sensitive zone so as to further improve the reinforcement of this zone.

Naturally, the reinforcing structure 40 could extend in other zones of the reinforcing edge 20, or indeed throughout it, in all directions.

FIG. 8 shows two other examples of fiber structures, referred to as "sub-structures" 125A and 125B that are for assembling together in order to form a single fiber structure referred to as a "final" structure 125. The two sub-structures 125A and 125B are obtained by three-dimensionally weaving metal yarns, the sub-structure 125A being obtained by interlacing warp yarns 130 and weft yarns 138A, and the sub-structure 125B being obtained by interlacing warp yarns 136 and weft yarns 138B.

The warp yarns 130, 136, and the weft yarns 138A, 138B may be composite or non-composite. In the example shown, the yarns 130 and 138A are composite yarns having a ceramic fiber core made of silicon carbide and a coating made of titanium (or boron) alloy. The yarns 136 and 138B are titanium alloy yarns.

In the example shown, the warp yarns 130 of the sub-structure 125A are of larger diameter than the warp yarns 136 of the sub-structure 125B, thereby having the advantage of weaving fewer yarns and of obtaining a sub-structure 125A that is more flexible since it presents a lower contexture.

In the example shown, the sub-structures 125A and 125B are assembled together by point bonding/welding as shown diagrammatically in FIG. 9 by points 135.

The final structure 125 that results from assembling the sub-structures 125A and 125B have advantages analogous to those of the structure 25 of FIG. 5 and also has the following possibilities:

it is possible for the sub-structures to have different orientations;

it is possible for there to be large variations of shape and thickness between the sub-structures, thus making it possible in the final structure to have large variations of shape and thickness that are difficult to obtain in any other way; and it is possible to achieve a shape that is particularly flat for one of the woven sub-structures.

Thereafter, the final structure 125 is subjected to hot isostatic pressing as described above with reference to FIGS. 6 and 7 so as to obtain a reinforcing edge (not shown) analogous to the reinforcing edge 20.

Figure 10:
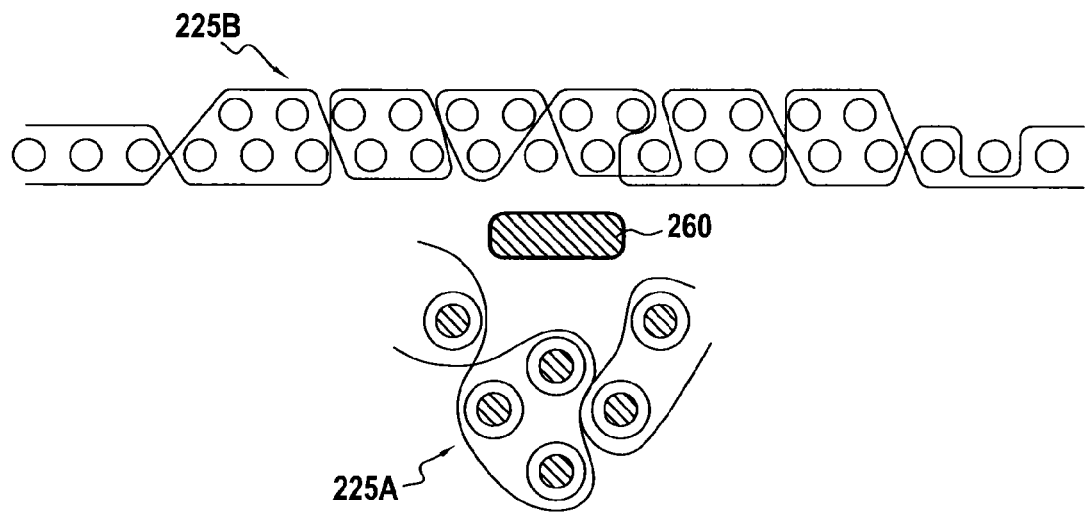
FIG. 10 shows two examples of fiber structures or sub-structures together with a metal insert, these three elements being designed to be assembled together before hot isostatic pressing.
Figure 11:
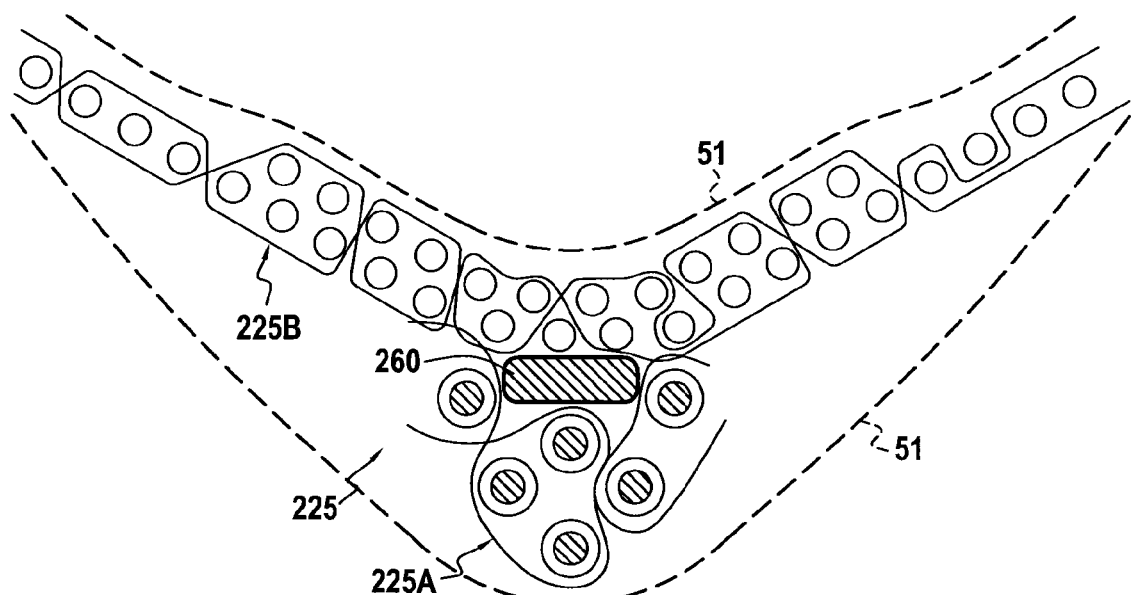
FIG. 11 shows the three elements of FIG. 10 when assembled together.

FIG. 10 shows two other fiber structures referred to as sub-structures 225A and 225B that are for assembling together, together with a metal insert 260. This insert 260 is arranged between the two fiber structures 225A and 225B before assembling the assembly together. In the example shown, the two fiber structures 225A and 225B together with the insert are freely inserted in tooling 51 represented by dashed lines in FIG. 11.

The insert 260 may also be inserted between two sub-structures that are bonded/welded together, attached via one or more metal yarns to sub-structures or indeed adhesively bonded or welded to one of the sub-structures prior to being inserted in tooling.

The insert 260 may have spikes enabling it to become attached to at least one of the sub-structures.

The presence of the metal insert 260 enables the thickness of the final structure 225 to be increased and thus enables the thickness of the reinforcing edge 20 as fabricated to be increased. This increase in thickness is shown by comparing FIGS. 9 and 11. In addition, the metal insert 260 may be formed by a method of the forging or machining type, it may be cast, or it may be of the section member type. The insert 260 may thus present (and thereby impart to the final structure 225) a shape that it would be difficult to obtain by weaving.

The final structure 225 that results from assembling together sub-structures 225A and 225B with the insert 260 also presents advantages analogous to those of the structure 25 of FIG. 5.

The final structure 225 is then subjected to hot isostatic pressing as described above with reference to FIGS. 6 and 7, so as to obtain a reinforcing edge (not shown) analogous to the reinforcing edge 20.

This reinforcing edge comprises a reinforcing structure of three-dimensionally woven ceramic fiber together with a matrix made of metal alloy. This matrix is the result of the metal portions of the sub-structures 225A and 225B, and of the metal insert 260 becoming agglomerated by compacting and by diffusion welding.

The invention claimed is:

1. A method of fabricating a reinforcing edge for a turbomachine blade, wherein the reinforcing edge extends longitudinally in a first direction and presents, in section in a plane perpendicular to the first direction, a profile that is generally C-shaped with a central portion of greater thickness and tapering branches, the method comprising:
    making at least one fiber structure by three-dimensionally weaving metal yarns; and
    subjecting the fiber structure to hot isostatic pressing so as to cause the metal yarns to agglomerate to obtain a solid part,
    wherein the metal yarns comprise a set of yarns made of metal or metal alloy, first composite yarns, and second composite yarns, the first and second composite yarns comprising a ceramic fiber core and a metal or metal alloy coating, the second composite yarns having a larger diameter than the first composite yarns, and
    wherein variation in thickness of the reinforcing edge is obtained by using the second composite yarns at least in an outside zone of the central portion and optionally by varying contexture.

2. The method according to claim 1, wherein the set of yarns are made of titanium or titanium alloy; and/or the ceramic fiber core is made of silicon carbide core, and the metal or metal alloy coating is made of titanium or of titanium alloy or of boron alloy.

3. The method according to claim 2, wherein the metal or metal alloy coating of the first and second composite yarns is made of the same metal or metal alloy as the set of yarns.

4. The method according to claim 1, wherein at least two fiber structures are made by three-dimensional weaving and the fiber structures are assembled together, with an assembly formed by the assembled-together fiber structures being subjected to the hot isostatic pressing.

5. The method according to claim 4, wherein a metal insert is placed between the two fiber structures before they are assembled together.

6. The method according to claim 1, wherein, in the three-dimensional weaving, the set of yarns and the second composite yarns are used as warp yarns, the first composite yarns are used as weft yarns, and the warp yarns extend along the first direction.

7. The method according to claim 1, wherein the metal or metal alloy coating of the first and second composite yarns is made of the same metal or metal alloy as the set of yarns.

8. A reinforcing edge for a turbomachine blade, comprising:
    a reinforcing structure of three-dimensionally woven ceramic fibers; and
    a metal or metal alloy matrix,
    wherein the reinforcing edge extends longitudinally in a first direction and presents, in a section in a plane perpendicular to the first direction, a profile that is generally C-shaped with a central portion of greater thickness and tapering branches,
    wherein the reinforcing structure of three-dimensionally woven ceramic fibers is situated at least in an outside zone of the central portion, and
    wherein larger-diameter warp yarns of the reinforcing structure are situated at least in the outside zone of the central portion.

9. A turbomachine blade comprising a reinforcing edge according to claim 8.

10. A turbomachine comprising a blade according to claim 9.

* * * * *